United States Patent
Leino et al.

(10) Patent No.: US 11,568,061 B2
(45) Date of Patent: Jan. 31, 2023

(54) PRIVATE MODEL UTILITY BY MINIMIZING EXPECTED LOSS UNDER NOISE

(71) Applicant: Robert Bosch GmbH, Stuttgart (DE)

(72) Inventors: Klas Leino, Pittsburgh, PA (US); Jorge Guajardo Merchan, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 16/862,056

(22) Filed: Apr. 29, 2020

(65) Prior Publication Data

US 2021/0342453 A1    Nov. 4, 2021

(51) Int. Cl.
*G06F 21/60* (2013.01)
*G06N 20/00* (2019.01)

(52) U.S. Cl.
CPC ............. *G06F 21/60* (2013.01); *G06N 20/00* (2019.01)

(58) Field of Classification Search
CPC ................................. G06F 21/60; G06N 20/00
See application file for complete search history.

(56) References Cited

U.S. PATENT DOCUMENTS

| | | | |
|---|---|---|---|
| 10,984,113 B1 * | 4/2021 | Dhaliwal | ................ H04L 63/14 |
| 2017/0316346 A1 | 11/2017 | Park et al. | |
| 2021/0216902 A1 * | 7/2021 | Sutcher-Shepard | ... G06N 20/00 |

FOREIGN PATENT DOCUMENTS

CN    109409125 A    10/2018

OTHER PUBLICATIONS

Abadi et al., Deep Learning With Differential Privacy, CSS '16, in Proceedings of the 2016 ACM SIGSAC Conference on Computer and Communications Security, Oct. 2016.
Bassily et al., Differentially Private Empirical Risk Minimization: Efficient Algorithms and Tight Error Bounds, Oct. 2014.
Chaudhuri et al., Differentially Private Empirical Risk Minimization, Journal of Machine Learning Research, vol. 12, Mar. 2011.
Fredrikson et al., Model Inversion Attacks That Exploit Confidence Information and Basic Countermeasures, CCS '15, in Proceedings of the 22nd ACM SIGSAC Conference on Computer and Communications Security, Oct. 2015.

(Continued)

*Primary Examiner* — Peter D McLoone
(74) *Attorney, Agent, or Firm* — Brooks Kushman P.C.

(57) ABSTRACT

Training of a model is performed to minimize expected loss under noise (ELUN) while maintaining differential privacy. Noise is added to weights of a machine learning model as random samples drawn from a noise distribution, the noise being added in accordance with a privacy budget. The ELUN is minimized by using a loss function that anticipates noise added to the weights of the machine learning model, to find a point in the parameter space for which loss is robust to the noise in the weights. The addition of noise and the minimization of the ELUN are iterated until the weights converge and optimization constraints are satisfied. The model is utilized on arbitrary inputs while protecting the privacy of training data used to train the model.

20 Claims, 6 Drawing Sheets

(56) References Cited

OTHER PUBLICATIONS

Fredrikson et al., Privacy in Pharmacogenetics: An End-to-End Case Study of Personalized Warfarin Dosing, in Proceedings of the 23rd USENIX Security Symposium, Aug. 2014.
Kifer et al., Private Convex Empirical Risk Minimization and High-Dimensional Regression, COLT 2012, in Proceedings of the 25th Annual Conference on Learning Theory, Jun. 2012.
Leino et al., Stolen Memories: Leveraging Model Memorization for Calibrated White-Box Membership Inference, Computer Research Repository (CoRR), Jun. 2019.
Li et al., Membership Privacy: A Unifying Framework for Privacy Definitions, CCS '13, in Proceedings of the 2013 ACM SIGSAC Conference on Computer & Communications Security, Nov. 2013.
Long et al., Towards Measuring Membership Privacy, Computer Research Repository (CoRR), Dec. 2017.
Shokri et al., Membership Inference Attacks Against Machine Learning Models, Computer Research Repository (CoRR), Mar. 2017.
Song et al., Stochastic Gradient Descent With Differentially Private Updates, IEEE Global Conference on Signal and Information Processing, Dec. 2013.
Srivastava et al., Dropout: A Simple Way to Prevent Neural Networks From Overfitting, Journal of Machine Learning Research, vol. 15, Jun. 2014.
Tang et al., Privacy Loss in Apple's Implementation of Differential Privacy on MacOS 10.12, Computer Research Repository (CoRR), Sep. 2017.
Wang et al., Subsampled Rényi Differential Privacy and Analytical Moments Accountant, Computer Research Repository (CoRR), Dec. 2018.
Wu et al., Revisiting Differentially Private Regression: Lessons From Learning Theory and Their Consequences, Computer Research Repository (CoRR), Dec. 2015.
Yeom et al., The Unintended Consequences of Overfitting: Training Data Inference Attacks, Computer Research Repository (CoRR), May 2018.
Dwork, Differential Privacy, In Michele Bugliesi, Bart Preneel, Vladimiro Sassone, and Ingo Wegener, editors, Automata, Languages and Programming, pp. 1-12, Springer Berlin Heidelberg, 2006.

* cited by examiner

300 →

---
Algorithm 1: DP Model with ELUN
---
def train_dp $(\mathcal{L}, \mathcal{D}, \epsilon > 0)$:

$\quad \tilde{w}^* \leftarrow \text{argmin}_w \frac{1}{|\mathcal{D}|} \sum_{(x,y) \in \mathcal{D}} \int_{-\infty}^{\infty} \mathcal{L}(w', (x,y)) e^{-\frac{|\mathcal{D}|\lambda\epsilon}{4\rho} \|w' - w\|_2} dw' + \frac{\lambda}{2} \|w\|^2$ $\quad$ Draw noise vector, $\eta$, according to p.d.f., $p(\eta) \propto \exp\left(-\frac{|\mathcal{D}|\lambda\epsilon}{4\rho} \|\eta\|_2\right)$ $\quad$ return $\tilde{w}^* + \eta$
---

---
Algorithm 2: DP Model with Sample-based ELUN
---
def train_dp $(\mathcal{L}, \mathcal{D}, R, \epsilon > 0)$:

$\quad$ for $i \in [R]$ do

$\quad\quad$ Draw noise vector, $\xi_i$, according to p.d.f., $p(\xi_i) \propto \exp\left(-\frac{|\mathcal{D}|\lambda\epsilon}{4\rho} \|\xi_i\|_2\right)$ $\quad \tilde{w}^* \leftarrow \text{argmin}_w \frac{1}{|\mathcal{D}|} \sum_{(x,y) \in \mathcal{D}} \frac{1}{R} \left( \sum_{i=1}^{R} \mathcal{L}(w + \xi_i, (x,y)) \right) + \frac{\lambda}{2} \|w\|^2$ $\quad$ Draw noise vector, $\eta$, according to p.d.f., $p(\eta) \propto \exp\left(-\frac{|\mathcal{D}|\lambda\epsilon}{4\rho} \|\eta\|_2\right)$ $\quad$ return $\tilde{w}^* + \eta$
---

FIG. 4

PRIVATE MODEL UTILITY BY MINIMIZING EXPECTED LOSS UNDER NOISE

TECHNICAL FIELD

The present disclosure relates to improving private model utility by minimizing expected loss under noise.

BACKGROUND

As machine learning has become ubiquitous even in privacy-sensitive domains, recent research has demonstrated concrete privacy threats, as well as explored robust privacy defenses, most notably differential privacy. When machine learning algorithms are applied to private training data, the resulting models might unwittingly leak information about that data through either their behavior or the details of their structure and parameters.

SUMMARY

According to one or more illustrative examples, a method includes training of a model is performed to minimize expected loss under noise (ELUN) while maintaining differential privacy. Noise is added to weights of a machine learning model as random samples drawn from a noise distribution, the noise being added in accordance with a privacy budget. The ELUN is minimized by using a loss function that anticipates noise added to the weights of the machine learning model, to find a point in the parameter space for which loss is robust to the noise in the weights. The addition of noise and the minimization of the ELUN are iterated until the weights converge and optimization constraints are satisfied. The model is utilized on arbitrary inputs while protecting the privacy of training data used to train the model.

According to one or more illustrative examples, a system for training and utilizing a model to minimize expected loss under noise (ELUN) while maintaining differential privacy includes a memory storing a machine learning model; and a computing device. The computing device is programmed to add noise to weights of the machine learning model as random samples drawn from a noise distribution, the noise being added in accordance with a privacy budget; minimize the ELUN by using a loss function that anticipates noise added to the weights of the machine learning model, to find a point in the parameter space for which loss is robust to the noise in the weights; iterate the addition of noise and the minimization of the ELUN until the weights converge and optimization constraints are satisfied; and utilize the model on arbitrary inputs while protecting the privacy of training data used to train the model.

According to one or more illustrative examples, a non-transitory computer readable medium comprising instructions for training and utilizing a model to minimize expected loss under noise (ELUN) while maintaining differential privacy that, when executed by a processor, cause the processor to perform operations including to add noise to weights of a machine learning model as random samples drawn from a noise distribution, the noise being added in accordance with a privacy budget; minimize the ELUN by using a loss function that anticipates noise added to the weights of the machine learning model, to find a point in the parameter space for which loss is robust to the noise in the weights; iterate the addition of noise and the minimization of the ELUN until the weights converge and optimization constraints are satisfied; and utilize the model on arbitrary inputs while protecting the privacy of training data used to train the model.

BRIEF DESCRIPTION OF THE DRAWINGS

FIG. 3 illustrates a first algorithm for producing a differentially private model that is trained to minimize ELUN;

FIG. 4 illustrates an alternate algorithm for producing a differentially private model that is trained to minimize ELUN;

DETAILED DESCRIPTION

Figure 1:
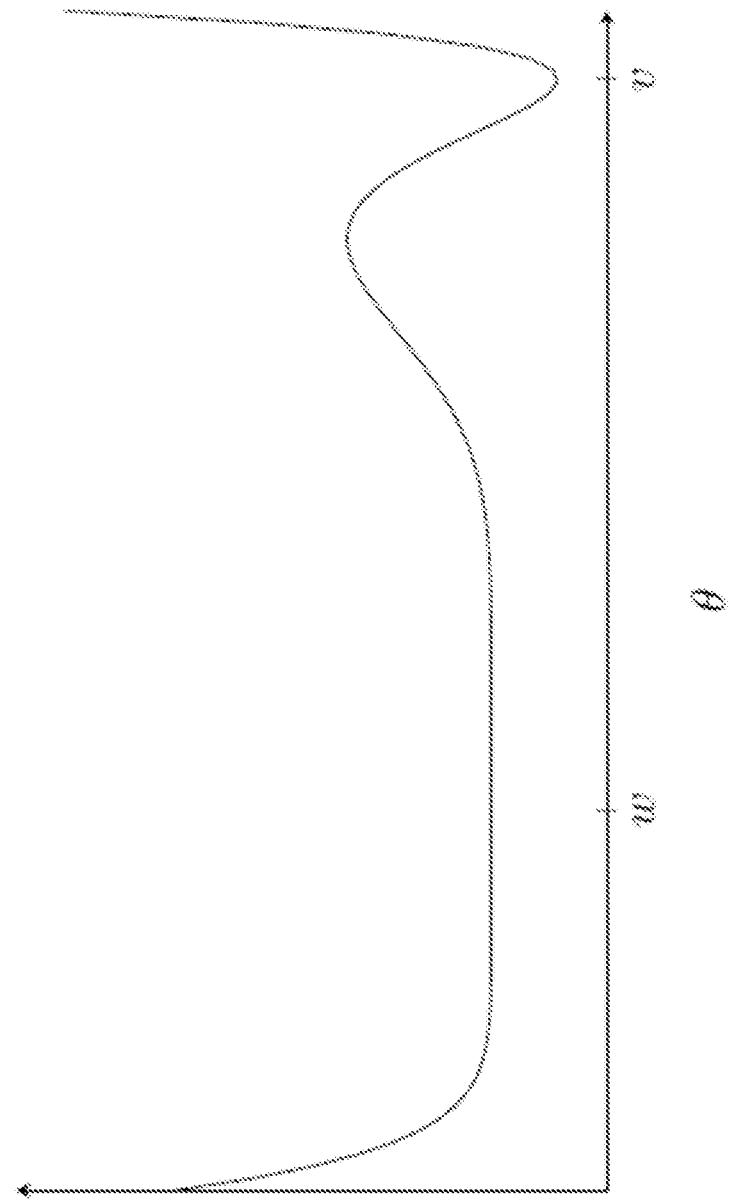
FIG. 1 provides an example of a non-convex loss function.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Machine learning has become increasingly prevalent, including in sensitive domains for which privacy is a concern. Previous work has highlighted privacy vulnerabilities in machine learning models—particularly, that an adversary exploiting access to a model can learn sensitive information about the private data on which the model was trained.

In order to combat privacy threats, a number of approaches have been proposed, most notably differential privacy, which gives a provable privacy guarantee. A typical way to achieve differential privacy for a linear machine learning model is to add noise to the model's weights. Unfortunately, this noise may detract, often significantly, from the model's utility.

While this utility trade-off might be unavoidable to some extent, it may be mitigated by finding a point in the parameter space for which the loss is robust to the noise in the weights. This intuition may be built on to improve private model utility.

As discussed in detail herein, the described approach involves three contributions. First, a novel loss function, Expected Loss Under Noise (ELUN), is described, which extends an arbitrary loss function to anticipate the noise that will be added to the parameters of a linear model. Second, theoretical analysis of ELUN demonstrating that a model trained to minimize ELUN can be made differentially private using the same amount of noise as would be required for the original loss function. This directly implies the existence of a differentially private algorithm for training linear models with ELUN. Third, a practical algorithm is supplied for obtaining a model minimizing ELUN with differential privacy.

One way to achieve differential privacy for a linear machine learning model is to add noise to weights of the model. Unfortunately, this noise may detract, often significantly, from the utility of the model. While this utility trade-off might be unavoidable to some extent, it may be possible to mitigate it by finding a point in the parameter space for which the loss is robust to the noise in the weights.

More formally, a model may be trained that minimizes expected loss under noise, i.e., that achieves the minimum possible loss in expectation when accounting for the uncertainty over the noisy weights. In order to do this, the following definition may be used:

Definition 1 Expected Loss Under Noise. Let $\mathcal{L}$ be a loss function defined over model parameters, $\theta$, and labeled points, $(x,y)$; and let $P_c$ be a noise distribution over possible model parameters, centered at $c$. Then the Expected Loss Under Noise (ELUN), $\tilde{\mathcal{L}}$, is given by $$\tilde{\mathcal{L}}(\theta, (x, y)) = \mathbb{E}_{\theta' \sim P_\theta}[\mathcal{L}(\theta', (x, y))]$$

A standard distribution used in the context of differential privacy is the Laplace distribution, which has a probability density function $$(PDF) \frac{1}{2b} \exp\left(-\frac{|x-\mu|}{b}\right)$$

for center, $\mu$, and scale, $b$. Applying this noise distribution to Definition 1, the expected loss under Laplacian noise is given by Equation 1:

$$\tilde{\mathcal{L}}(\theta, (x, y)) = \frac{1}{2b} \int_{-\infty}^{\infty} \mathcal{L}(\theta', (x, y)) e^{-\frac{|\theta' - \theta|}{b}} d\theta' \tag{1}$$

Remark 1 The point, $\tilde{\theta}^*$, minimizing $\tilde{\mathcal{L}}$ in expectation is not necessarily the same as the point, $\theta^*$, minimizing $\mathcal{L}$ in expectation.

FIG. 1 provides an example of a non-convex loss function for which $\tilde{\theta}^* \neq \theta^*$ under Laplacian noise with an appropriately large scale. However, even for convex loss functions, e.g., in logistic regression, the optimal parameters may differ when using ELUN.

For example, consider a one-dimensional logistic regression problem where the data are generated according to data distribution, $\mathcal{D}$, which is as follows:
1. y is drawn uniformly at random from {0,1}.
2. x is drawn according to $\mathcal{N}(\mu_y, \sigma^2)$—i.e., a normal distribution with mean $\mu_y$ and variance $\sigma^2$—where $\mu y=(2y-1)\mu$.

For linear logistic model, $s(wx)$, let $\mathcal{L}(w,(x,y))= \ell(s(wx),y)$. The expected loss over $\mathcal{D}$ can be computed as a function of w, since how the data are generated is known; this is given by Equation 2, which becomes Equation 3 when $\ell$ is chosen to be binary cross-entropy.

$$\mathbb{E}_{X,Y \sim \mathcal{D}}[\mathcal{L}(\omega, (X, Y))] = \sum_{y \in \{0,1\}} \frac{1}{2} \int_{-\infty}^{\infty} \ell(s(\omega x), y) \mathcal{N}(\mu_y, \sigma^2) dx \tag{2}$$

$$= \frac{1}{\sigma\sqrt{8\pi}} \int_{-\infty}^{\infty} \sum_{j \in \{-1,1\}} \log(1 + e^{j\omega x}) e^{-\frac{(x+j\mu)^2}{\sigma^2}} dx \tag{3}$$

Meanwhile, the expected ELUN over $\mathcal{D}$ is given by Equation 4 when using Laplacian noise with scale, b, and binary cross-entropy loss.

$$\mathbb{E}_{X,Y \sim \mathcal{D}}[\tilde{\mathcal{L}}(\omega, (X, Y))] = \tag{4}$$

$$C \int_{-\infty}^{\infty} \int_{-\infty}^{\infty} \sum_{j \in \{-1,1\}} \log(1 + e^{j\omega' x}) |e^{-\frac{(x+j\mu)^2}{\sigma^2} + \frac{|\omega'-\omega|}{b}} d\omega' dx$$

where $$C = \frac{1}{\sigma b \sqrt{32\pi}}$$

Figure 2:
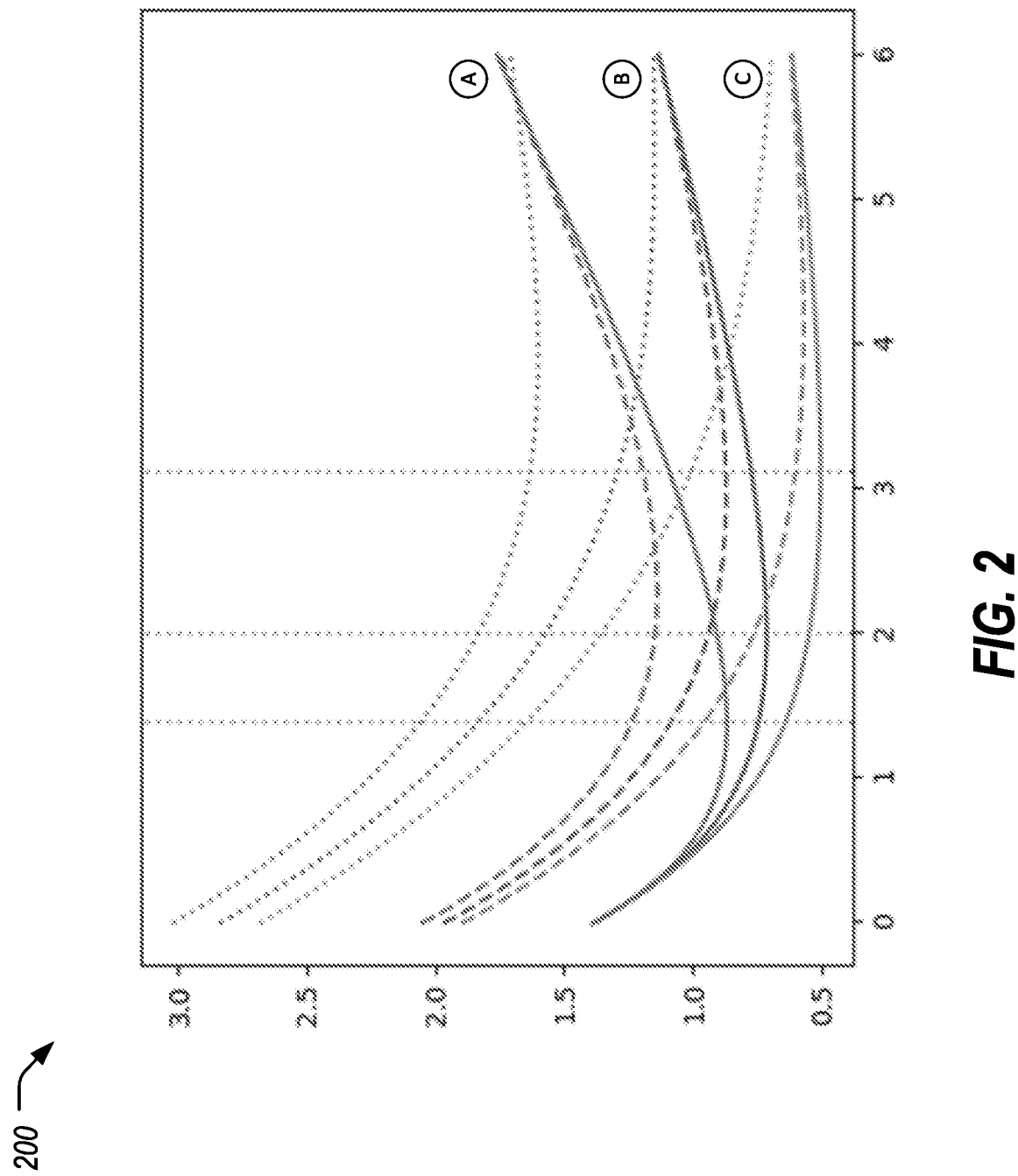
FIG. 2 illustrates the expected loss of a simple one-dimensional logistic regression problem as a function of weight.

FIG. 2 illustrates the expected loss of a simple one-dimensional logistic regression problem 200 as a function of weight w, for $\mu=1$, $\sigma=1$:2 (A), 1:0 (B), and 0:8 (C), and b=1:0 & 2:0. Notably, the optimal weight, i.e., the point at which the curve reaches its minimum, is larger when using ELUN (Equation 4) than when using simply binary cross-entropy (Equation 3).

This is due to the asymmetry in the binary cross-entropy loss function; when at the optimal weight without noise, the cost in loss is higher for slight underestimations of w than for slight overestimations. Thus, when noise is to be added to w, it is preferable to slightly overestimate the weight to avoid the disproportionately high cost of the noise leading to a weight that is too small.

Differential privacy is a commonly-used, strong notion of privacy that, in the context of machine learning, is a property of the learning rule stating that the presence or absence of any particular training point does not significantly impact the specific model learned by the rule. More formally, differential privacy is given by Definition 2 (stated in the context of ML).

Definition 2 Differential Privacy (Dwork). Let $\mathcal{M}$ be a (randomized) mechanism that, given a dataset, $\mathcal{D}$, returns a model, $f \in \mathcal{F}$. $\mathcal{M}$ is $\epsilon$-differentially private if for all $F \subset \mathcal{F}$ and for all neighboring $\mathcal{D}$, $\mathcal{D}'$ such that $\exists_i$: $\mathcal{D}_i \neq \mathcal{D}_i' \wedge \forall j \neq i$, $\mathcal{D}_j \neq \mathcal{D}_j'$.

$$Pr[\mathcal{M}(\mathcal{D}) \in F] \leq e^\epsilon Pr[\mathcal{M}(\mathcal{D}') \in F]$$

When a model, f, is learned using an $\epsilon$-differentially private mechanism, it can be said that f itself is $\epsilon$-differentially private.

One common way of achieving differential privacy is to add Laplacian noise to the output of a non-private mechanism, M. In the context of linear machine learning models, this corresponds to adding noise to each of the weights of the trained model. (It should be noted that the use of a linear model is only one example, and other types of models, such as Support Vector Machine, a Convolutional Neural Network (CNN), or a Deep Neural Network (DNN) may additionally or alternately be used). The scale of the noise is determined by the privacy budget, $\epsilon$, and the sensitivity of M—the maximum amount by which the output of M can differ on neighboring inputs.

Wu et al. use a variant on strongly-uniform-RO stability to bound the sensitivity of learning rules that learn linear models on strongly convex, Lipschitz continuous loss functions. Their result is summarized in Theorem 1.

Theorem 1 (Wu et al.). Let M be a learning rule with a $\lambda$-strongly convex loss function, $\ell(\theta,(x,y)) = \mathcal{L}(\theta,(x,y)) + \varrho(\theta)$, where $\varrho$ is a regularizer and $\mathcal{L}$ is $\rho$-Lipschitz with respect to $\theta$ for all $x \in X$. Then the sensitivity of M on a dataset of size n is bounded by $$\frac{4\rho}{\lambda n}.$$

Thus, for $\lambda$-strongly convex, $\rho$-Lipschitz loss functions, M can be made $\epsilon$-differentially private by adding Laplacian noise with scale $$\frac{4\rho}{\lambda n \epsilon}.$$

In the case of logistic or softmax regression, commonly used for classification problems, $\mathcal{L}$ is binary or categorical crossentropy, which are $\rho$-Lipschitz when X is norm-bounded by $\rho$. In some cases, such a bound may readily exist, e.g., for images where the pixel values are in the range [0, 1]; in other cases it can be achieved by a preprocessing step in which the values are clipped to obtain the desired $\rho$. Crossentropy can be made $\lambda$-strongly convex by adding a regulizer term, $$\varrho(\theta) = \frac{\lambda}{2}\|\theta\|^2.$$

A Note on Clipping. $\rho$ is to be selected appropriately for the dataset, however, care should be taken regarding the privacy implications of selecting p based on the data. If $\rho$ can be selected a priori, or can be assumed to be public, then there are no privacy concerns. If $\rho$ is selected, e.g., as the maximum norm of the data, then it may be desirable to select p in a differentially private fashion and factor it into the privacy analysis.

Proposition 1 If loss function, $\mathcal{L}(\theta(x,y))$, is $\rho$-Lipschitz with respect to $\theta$ for all $x \in X$, then $\tilde{\mathcal{L}}(\theta,(x,y))$, is also $\rho$-Lipschitz with respect to $\theta$ for all $x \in X$.

Proof. Let $P_c$ be the PDF of a noise distribution over possible model parameters, $\theta$, centered at c. It can be assumed that $\mathcal{L}(\theta,(x,y))$ is $\rho$-Lipschitz with respect to $\theta$ for all $x \in X$, thus $\forall \theta_1, \theta_2, |\mathcal{L}(\theta_1,(x,y)) - \mathcal{L}(\theta_2,(x,y))| < \rho|\theta_1 - \theta_2|$. Let $\tilde{\mathcal{L}}(\theta,(x,y))$ be the ELUN. This gives:

$$\tilde{\mathcal{L}}(\theta, (x, y)) = \mathbb{E}_{\theta' \sim P_\theta}\left[\mathcal{L}(\theta', (x, y))\right] = \int_{-\infty}^{\infty} \mathcal{L}(\theta', (x, y)) P_\theta(\theta') d\theta'$$

Thus, for all $\theta_1, \theta_2$:

$$|\tilde{\mathcal{L}}(\theta_1, (x, y)) - \tilde{\mathcal{L}}(\theta_2, (x, y))| = \left|\int_{-\infty}^{\infty} \mathcal{L}(\theta', (x, y))(P_{\theta_1}(\theta') - P_{\theta_2}(\theta')) d\theta'\right| \quad (5)$$

$$= \left|\int_{-\infty}^{\infty} (\mathcal{L}(\theta' + \theta_1, (x, y)) - \mathcal{L}(\theta' + \theta_2, (x, y))) P_\theta(\theta') d\theta'\right|$$

$$= \int_{-\infty}^{\infty} |\mathcal{L}(\theta' + \theta_1, (x, y)) - \mathcal{L}(\theta' + \theta_2, (x, y))| P_\theta(\theta') d\theta' \quad (6)$$

$$< \int_{-\infty}^{\infty} \rho|\theta' + \theta_1 - \theta' - \theta_2| P_0(\theta') d\theta' \quad (7)$$

$$= \rho|\theta_1 - \theta_2| \quad (8)$$

Equation 5 follows by reindexing, Equation 6 follows because $P_\theta \geq 0$, Equation 7 follows by the assumption that $\mathcal{L}$ is $\rho$-Lipschitz, and Equation 8 follows because $P_\theta$ is a probability measure. Thus, $\tilde{\mathcal{L}}(\theta,(x,y))$, is $\rho$-Lipschitz with respect to $\theta$ for all $x \in X$.

Thus, Theorem 1 can be applied to the ELUN, $\tilde{\mathcal{L}}$, that corresponds to the scale of the noise to be added to the original loss function, $\mathcal{L}$. This gives a way to produce a differentially private model that is trained to minimize ELUN, detailed in Algorithm 1 as shown in FIG. 3. Since the sensitivity, and thus the scale of the noise that must be added, is the same for both $\mathcal{L}$ and $\tilde{\mathcal{L}}$, the model learned by Algorithm 1 anticipates the exact amount of noise that is added to it. The resulting model is therefore the optimal post-noise model for the original loss function, $\mathcal{L}$.

In general, ELUN for Laplacian noise (Equation 1) is not analytically solvable. A numerical solution is possible, however, in high dimensions, computing the integral becomes intractable, as the work to compute the integral scales exponentially with the dimension. This means it is not always possible to efficiently apply Algorithm 1 directly. Therefore, in practice ELUN is approximated, which can be achieved efficiently via sampling.

FIG. 4 illustrates an ELUN Algorithm 2 that describes a practical alternative to ELUN Algorithm 1. Essentially, a resolution, R, is chosen and the expectation over the noise is approximated via R random samples drawn from a Laplace distribution. In practice, the argmin can be found via standard optimization algorithms, e.g., gradient descent.

Notice that in the limit, the sum converges to the integral over the probability density function, and that Proposition 1 still applies via essentially the same proof (by replacing the integral with a sum and $P(\theta)$ with $$\frac{1}{R}.$$

Therefore, the model returned by Algorithm 2 is also $\epsilon$-differentially private.

As illustrated by Remark 1, ELUN allows us to specify a model that may be better post-noise than a post-noise model trained using the original loss function (e.g., as done by Wu et al.). Evidence that this potential advantage can be realized in practice is now shown; the utility for differentially private models trained with ELUN tends to exceed that of differentially private models trained with crossentropy, particularly for small values of e (greater privacy guarantee).

Figure 5:
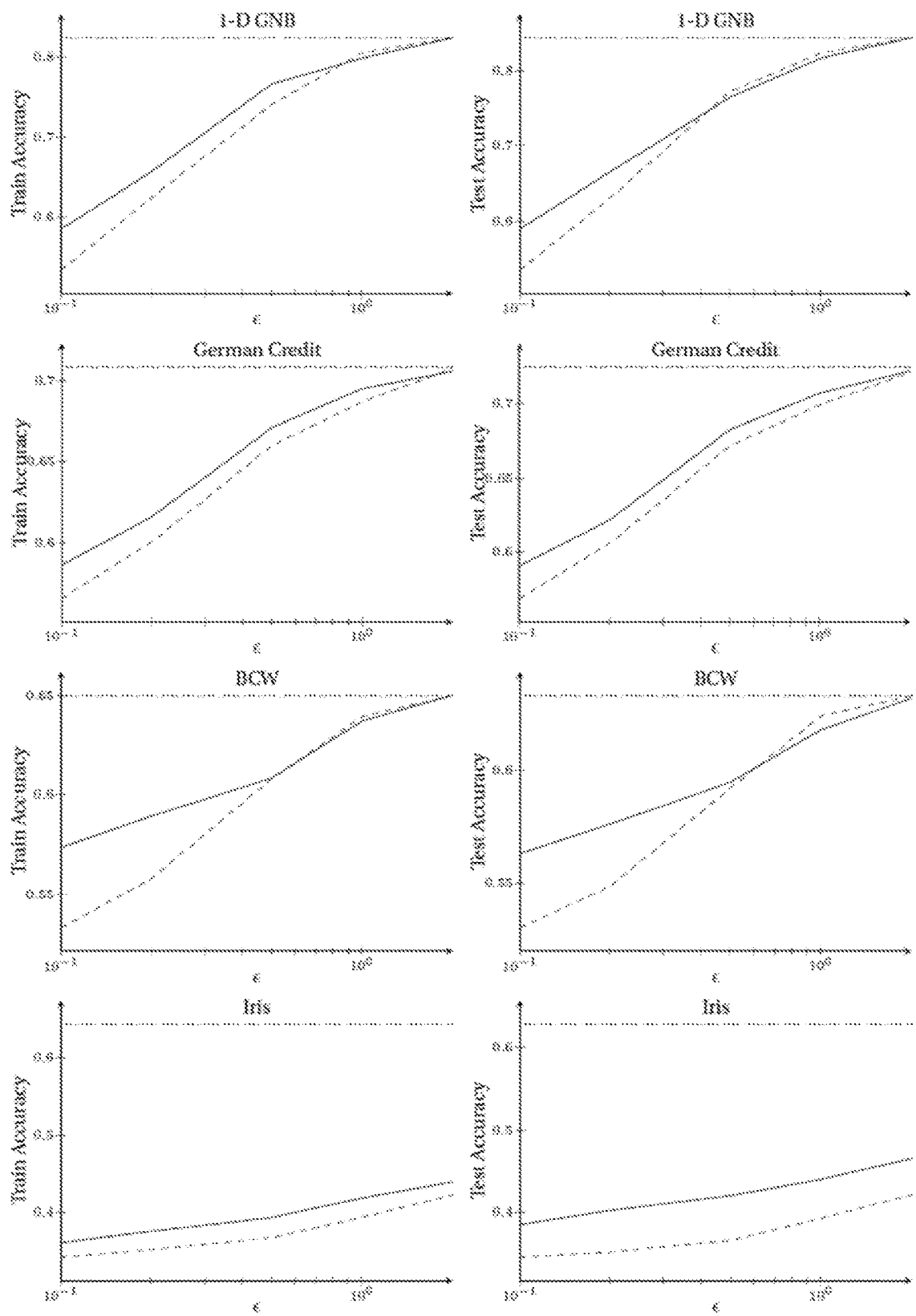
FIG. 5 illustrates the train and test accuracy for linear models trained with different approaches.

FIG. 5 illustrates the train and test accuracy for linear models trained with different approaches. As shown, the graphs indicates train and test accuracy with no differential privacy (black, dotted), with output perturbation (red, dashed), and through use of Algorithm 2 (blue, solid), on various datasets, for various values of e. The results are averaged over 100 trials on each dataset with $\lambda=0.05$, $\rho=2.0$, and $R=50$.

For small values of e (where the privacy guarantee is the best), Algorithm 2 consistently outperforms prior work, and often by a significant margin. For large e, both differentially private models approach the performance of the non-private model, however, it is important to note that for large e, the privacy guarantee becomes meaningless as shown in Yeom et al.

Notably, the parameters learned with ELUN generalize well; despite the fact that ELUN is minimized on the training data, Algorithm 2 outperforms prior work on the test data as well.

Thus, the differentially private training mechanism produces better-performing models than the current comparable state-of-the-art methods for small E (corresponding to strong privacy guarantees).

Figure 6:
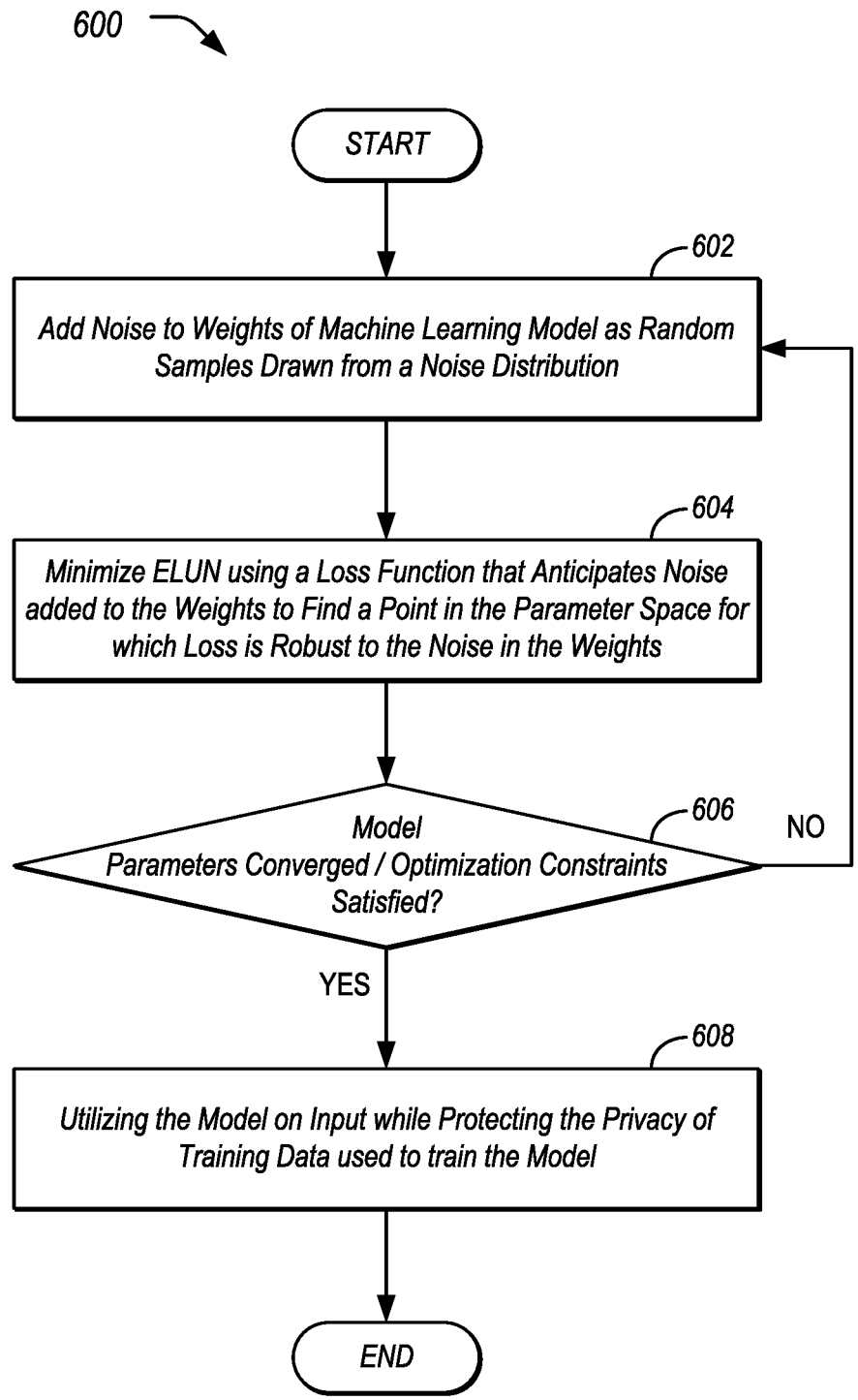
FIG. 6 illustrates an example process for training and utilizing a model to minimize expected loss under noise while maintaining differential privacy.

FIG. 6 illustrates an example process 600 for training and utilizing a model to minimize expected loss under noise (ELUN) while maintaining differential privacy. In an example, the process 600 may be performed by one or more computing devices, such as the computing device 700 described herein.

At operation 602, noise is added to weights of a machine learning model as random samples drawn from a noise distribution. In an example, the noise may be added in accordance with a privacy budget. The noise may be Laplacian noise drawn according to a probability density function of a normal distribution, wherein the noise is approximated via random samples drawn from the Laplace distribution. It should be noted that this is merely one example, and other distributions of noise may be used, such as Gaussian noise. The machine learning model may be a linear model.

At operation 604, the ELUN is minimized by using a loss function that anticipates noise added to the weights of the machine learning model, to find a point in the parameter space for which loss is robust to the noise in the weights. Minimizing the ELUN may include the use of standard optimization algorithms, such as gradient descent.

At operation 606, the model is evaluated to identify whether the model parameters have converged and whether the given optimization constraints are satisfied. If not, control returns to operation 602 to perform a further iteration. If so, the model is deemed complete and control passes to operation 608.

At operation 608, the model is utilized on arbitrary inputs while protecting the privacy of training data used to train the model. After operation 606, the process 600 ends.

Figure 7:
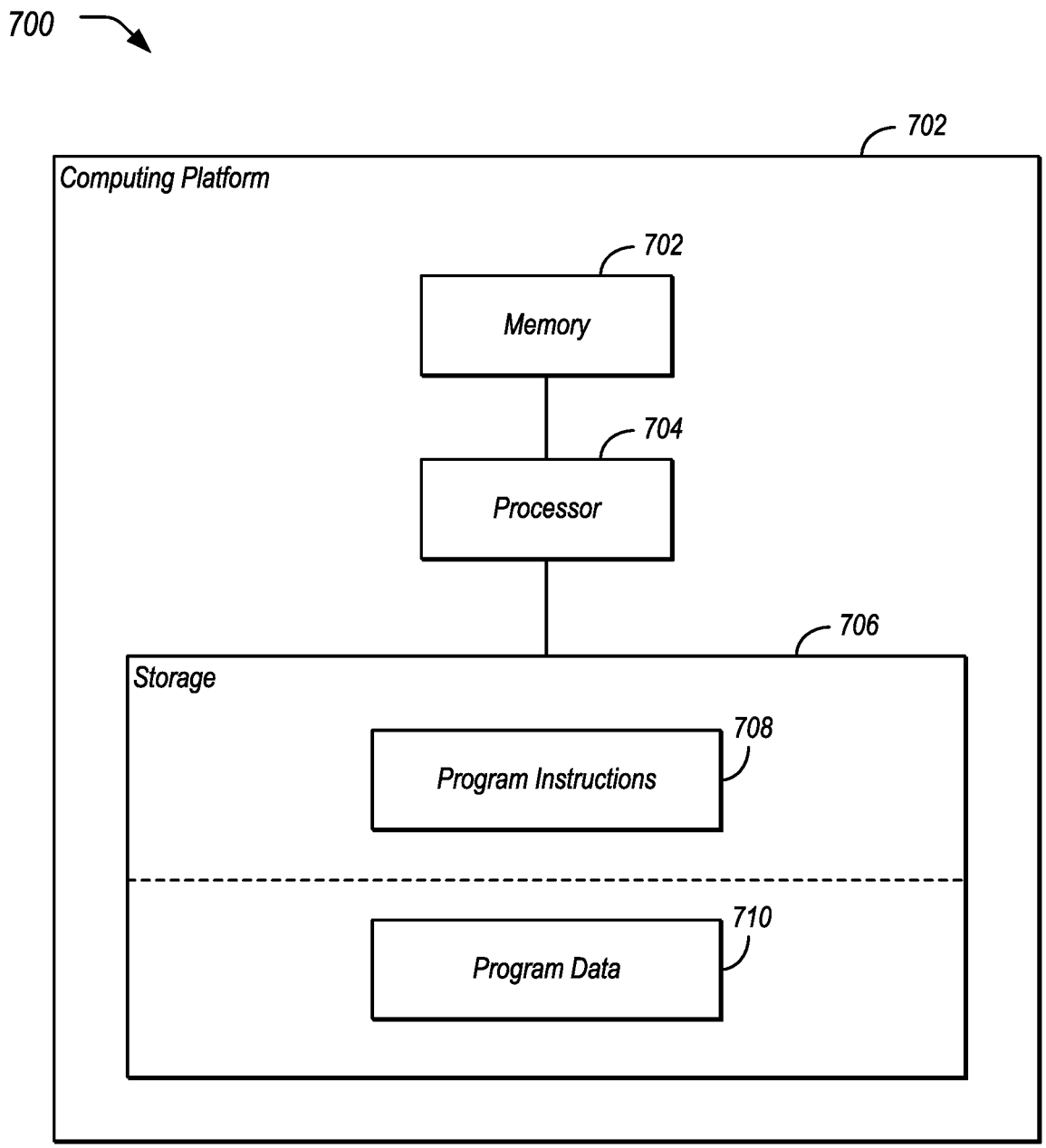
FIG. 7 illustrates an example computing device.

FIG. 7 illustrates an example computing device 700. The algorithms and/or methodologies of one or more embodiments discussed herein may be implemented using such a computing device. The computing device 700 may include memory 702, processor 704, and non-volatile storage 706. The processor 704 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 702. The memory 702 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 706 may include one or more persistent data storage devices such as a hard drive, optical drive, tape drive, non-volatile solid-state device, cloud storage or any other device capable of persistently storing information.

The processor 704 may be configured to read into memory 702 and execute computer-executable instructions residing in program instructions 708 of the non-volatile storage 706 and embodying algorithms and/or methodologies of one or more embodiments. The program instructions 708 may include operating systems and applications. The program instructions 708 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. In one embodiment, PyTorch, which is a package for the Python programming language, may be used to implement code for the machine learning model of one or more embodiments.

Upon execution by the processor 704, the computer-executable instructions of the program instructions 708 may cause the computing device 700 to implement one or more of the algorithms and/or methodologies disclosed herein. The non-volatile storage 706 may also include data 710 supporting the functions, features, and processes of the one or more embodiments described herein. This data 710 may include, as some examples, training data, models, sampled noise, model inputs, and model outputs.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for training and utilizing a model to minimize expected loss under noise (ELUN) while maintaining differential privacy, the method comprising:
adding noise to weights of a machine learning model as random samples drawn from a noise distribution, the noise being added in accordance with a privacy budget;
minimizing the ELUN by using a loss function that anticipates the noise added to the weights of the machine learning model to minimize expected loss post-noise, to find a point in the parameter space for which loss is robust to the noise in the weights;
iterating the addition of noise and the minimization of the ELUN until the weights converge and optimization constraints are satisfied; and
utilizing the model on arbitrary inputs while protecting the privacy of training data used to train the model.

2. The method of claim 1, wherein the noise includes Laplacian noise.

3. The method of claim 1, wherein the noise includes Gaussian noise.

4. The method of claim 1, wherein the noise is approximated via random samples drawn from the Laplace distribution.

5. The method of claim 1, wherein the machine learning model is a linear machine learning model.

6. The method of claim 1, wherein the machine learning model includes one or more of a Support Vector Machine, a Convolutional Neural Network (CNN), or a Deep Neural Network (DNN).

7. The method of claim 1, wherein minimizing the ELUN includes optimization according to gradient descent.

8. The method of claim 1, wherein the ELUN is denoted by $\tilde{\mathcal{L}}$, and given by:

$$\tilde{\mathcal{L}}(\theta, (x, y)) = \mathop{\mathbb{E}}_{\theta' \sim P_\theta} [\mathcal{L}(\theta', (x, y))]$$

where $\mathcal{L}$ is a loss function defined over model parameters, $\theta$, and labeled points, (x, y); and $P_c$ is a noise distribution over possible model parameters, centered at c.

9. A system for training and utilizing a model to minimize expected loss under noise (ELUN) while maintaining differential privacy, the system comprising:
a memory storing a machine learning model; and
a computing device, programmed to
add noise to weights of the machine learning model as random samples drawn from a noise distribution, the noise being added in accordance with a privacy budget;
minimize the ELUN by using a loss function that anticipates the noise added to the weights of the machine learning model to minimize expected loss post-noise, to find a point in the parameter space for which loss is robust to the noise in the weights;
iterate the addition of noise and the minimization of the ELUN until the weights converge and optimization constraints are satisfied; and
utilize the model on arbitrary inputs while protecting the privacy of training data used to train the model.

10. The system of claim 9, wherein the noise includes one or more of Laplacian noise or Gaussian noise.

11. The system of claim 9, wherein the noise is approximated via random samples drawn from the Laplace distribution.

12. The system of claim 9, wherein the machine learning model includes one or more of a linear machine learning model, a Support Vector Machine, a Convolutional Neural Network (CNN), or a Deep Neural Network (DNN).

13. The system of claim 9, wherein minimizing the ELUN includes optimization according to gradient descent.

14. The system of claim 9, wherein the ELUN is denoted by $\tilde{\mathcal{L}}$, and given by:

$$\tilde{\mathcal{L}}(\theta, (x, y)) = \mathop{\mathbb{E}}_{\theta' \sim P_\theta} [\mathcal{L}(\theta', (x, y))]$$

where $\mathcal{L}$ is a loss function defined over model parameters, $\theta$, and labeled points, (x, y); and $P_c$ is a noise distribution over possible model parameters, centered at c.

15. A non-transitory computer readable medium comprising instructions for training and utilizing a model to minimize expected loss under noise (ELUN) while maintaining differential privacy that, when executed by a processor, cause the processor to perform operations including to:
add noise to weights of a machine learning model as random samples drawn from a noise distribution, the noise being added in accordance with a privacy budget;
minimize the ELUN by using a loss function that anticipates the noise added to the weights of the machine learning model to minimize expected loss post-noise, to find a point in the parameter space for which loss is robust to the noise in the weights;

iterate the addition of the noise and the minimization of the ELUN until the weights converge and optimization constraints are satisfied; and utilize the model on arbitrary inputs while protecting the privacy of training data used to train the model.

16. The medium of claim 15, wherein the noise includes one or more of Laplacian noise or Gaussian noise.

17. The medium of claim 15, wherein the noise is approximated via random samples drawn from the Laplace distribution.

18. The medium of claim 15, wherein the machine learning model is a linear machine learning model.

19. The medium of claim 15, wherein minimizing the ELUN includes optimization according to gradient descent.

20. The medium of claim 15, wherein the ELUN is denoted by $\tilde{\mathcal{L}}$, and given by:

$$\tilde{\mathcal{L}}(\theta, (x, y)) = \mathbb{E}_{\theta' \sim P_\theta} [\mathcal{L}(\theta', (x, y))]$$

where $\mathcal{L}$ is a loss function defined over model parameters, $\theta$, and labeled points, $(x, y)$; and $P_c$ is a noise distribution over possible model parameters, centered at c.

* * * * *